May 11, 1954

R. E. ROSS 2,677,853

ADJUSTABLE AND SEPARABLE HINGE

Filed April 26, 1951

INVENTOR:
Robert E Ross

Patented May 11, 1954

2,677,853

UNITED STATES PATENT OFFICE 2,677,853

ADJUSTABLE AND SEPARABLE HINGE

Robert E. Ross, Lexington, Mass., assignor to United-Carr Fastener Corporation, Cambridge, Mass., a corporation of Massachusetts Application April 26, 1951, Serial No. 222,976

1 Claim. (Cl. 16—129)

This invention relates generally to socket members, and has particular reference to a socket member for engaging a stud in such a manner that the stud is capable of substantial tilting in the socket.

The object of the invention is to provide a socket member having spaced stud-engaging portions in which guide channels are provided to faciliate insertion of the stud into the socket.

A further object of the invention is to provide a socket member having a base and a pair of spaced side walls having opposing stud-engaging portions in which opposing guide channels are provided in the walls to lead a stud into the stud-receiving portions.

Another object of the invention is to provide a socket member having a pair of spaced walls with a series of opposing longitudinally spaced stud-receiving recesses in which guide channels are provided in the walls to facilitate entry of a stud between the walls into the recesses and to allow adjustment of the stud from one set of opposing recesses to another.

Other objects of the invention will, in part, be obvious, and will, in part, appear hereinafter.

In the drawing:

Fig. 2 is an enlarged view of a stud and socket assembly of Fig. 1 in which the eyeshield is in the down position;

Fig. 3 is a view similar to Fig. 2 in which the eyeshield is in the up position;

Fig. 4 is a view of the assembly of Fig. 2 as seen from the right end;

Fig. 5 is a perspective view of the socket member utilized in the assembly of Fig. 2;

Fig. 6 is a top plan view, partly in section, of the socket member of Fig. 5;

Fig. 7 is an end view of the stud member utilized in the assembly of Fig. 2;

Fig. 8 is a view in elevation, partly in section, of a modified form of socket member embodying the features of the invention;

Fig. 9 is a top plan view of the socket member of Fig. 8; and

Fig. 10 is a view in section taken on line 10—10 of Fig. 9.

Figure 1:
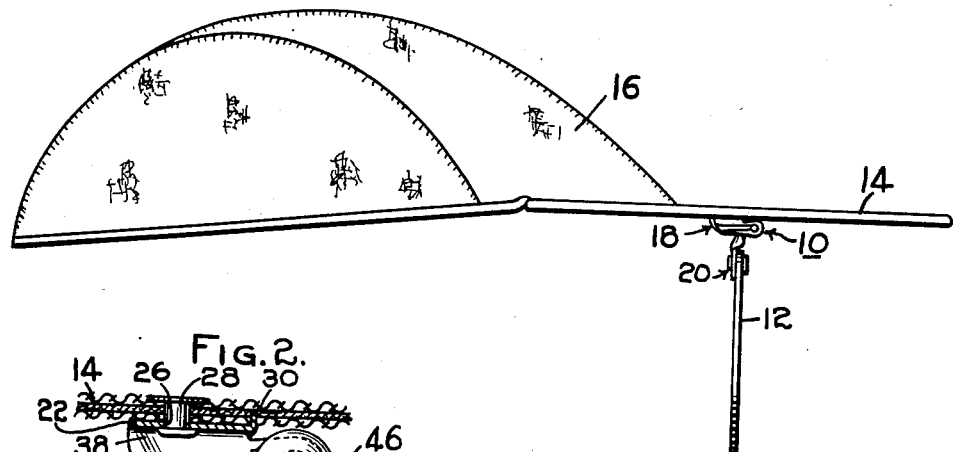
Fig. 1 is a view in elevation of a cap and eyeshield assembly which utilizes a socket member having the features of the invention.
Figure 1:
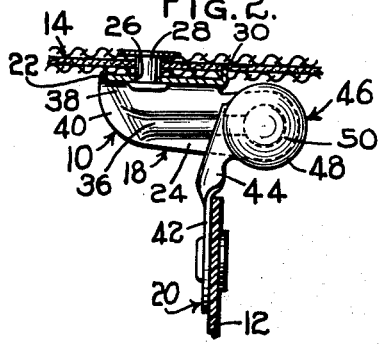
Figure 1:
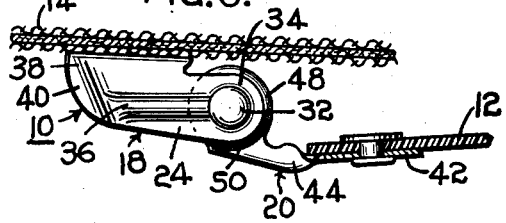
Figure 1:
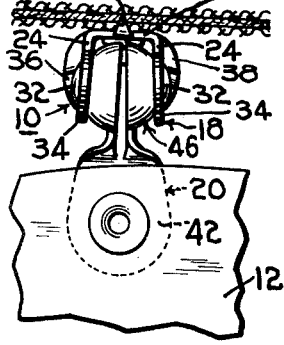
Figure 1:
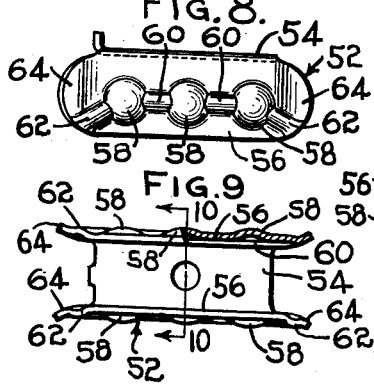
Figure 1:
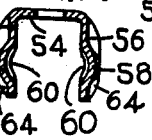
Figure 1:
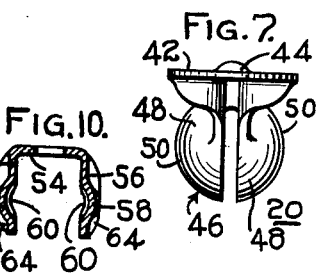

Referring to the drawing, there is illustrated a stud and socket snap fastener assembly 10, which is adapted for use in attaching an eyeshield 12 to the visor 14 of a cap 16 or the like. The assembly 10 comprises a socket member 18 for attachment to the visor 14 and a stud member 20 for attachment to the eyeshield 12.

In the embodiment illustrated in Figs. 1 to 6, the socket 18 comprises an elongated base 22 and a pair of spaced side walls 24 provided with a central opening 26 for receiving an attaching rivet 28, and a pointed tongue 30 extending from the base for piercing the visor 14 to prevent rotation of the socket thereon.

The walls 24 are provided with inner concave recesses 32 which are disposed opposite each other near one end 34 thereof to receive the stud in snapping engagement therebetween. To facilitate assembly of the stud into said recesses, a pair of outwardly embossed guide channels 36 are provided opposite each other in the walls, and said channels extend from said recesses generally toward the other end 38 of the walls, and are slightly inclined away from the base 22. The walls 24 diverge slightly from each other toward the end 38, and the portions 40 of the edge of the walls toward which the channels 36 extend are flared outwardly from each other to facilitate entry of the stud between the walls and into the channels.

The stud member for use with the socket may be either of the type having an enlarged solid head, or of the type having a resilient head as shown in Fig. 7. In the illustrated embodiment, the stud 20 comprises a flat end portion 42 for attachment to the eyeshield 12, an intermediate channel-shaped arm portion 44, and a socket-engaging portion 46 at the other end of the arm. The socket-engaging portion 46 comprises a pair of spaced convex portions 48 having peripheral portions 50 which are attached to opposite sides of the channel-shaped arm so that the arm 44 extends substantially tangentially therefrom and the convex portions 48 are flexible toward and away from each other. The width of the socket-engaging portion 46 is greater than the distance between the recesses 32 in the walls, but by reason of the slight divergence of the walls, the width of the socket-engaging portion is not substantially greater than the distance between the flared end portions 40 of the walls.

Hence, to assemble the stud into the socket, the socket-engaging portion 46 is inserted between the flared ends 40 so that the convex portions 48 enter the guide channels 36. The stud may then be slid along in the channels toward the recesses 32 with no possibility of the socket-engaging portion snapping out from between the walls. As the stud slides along the channels, the convergence of the walls causes the convex portions 48 of the stud to be flexed toward each other, until they snap outwardly into the recesses 32. Thereafter, there is sufficient frictional engagement between the stud and socket to retain the eyeshield in any predetermined position. Since the convex portions 48 are attached to the arm 44 so that the arm extends substantially tangentially therefrom, the eyeshield may be moved to the up position without interference between the arm and the socket walls.

Referring now to Figs. 8 to 10, there is illustrated a modified form of a socket member 52 embodying the features of the invention. The socket 52 comprises generally an elongated base 54 and a pair of elongated side walls 56 having a series of pairs of opposing recesses 58 spaced longitudinally thereon to receive the stud therebetween, so that the stud may be adjusted to various longitudinal positions in the socket. For this reason, adjustment channels 60 are provided in the walls which extend between adjacent recesses, so that the stud may be snapped from one opposing pair of recesses to another in the channels without the possibility of the stud becoming disengaged from the socket. To provide means for inserting the stud into the socket, assembly channels 62 are also provided in the walls which extend from an opposing pair of recesses to an adjacent flared portion 64 of the edge of the wall.

The modified socket 52 may also be used with either a solid stud or a resilient stud as hereinbefore described.

Since certain obvious modifications may be made in the device without departing from the scope of the invention, it is intended that all matter contained herein be interpreted in an illustrative and not in a limiting sense.

I claim:

A socket member for receiving an enlarged head of a stud in snapping engagement therewith, said socket member comprising a base for attachment to a supporting member and a pair of elongated spaced walls on the base, said walls having a series of opposing stud-head receiving portions disposed longitudinally therein, each wall having embossed adjustment guide channels extending between adjacent stud-head receiving portions to facilitate adjustment of said stud from one opposing pair of stud-receiving portions to another, and an assembly guide channel extending from one of said stud-head receiving portions toward an edge portion of said wall, said edge portions of said walls toward which said assembly guide channels extend being flared outwardly from each other to facilitate entry of a stud-head into said assembly guide channels.

References Cited in the file of this patent

UNITED STATES PATENTS

| Number | Name | Date |
| --- | --- | --- |
| 124,008 | Page | Feb. 27, 1872 |
| 416,465 | Lawson | Dec. 3, 1889 |
| 551,406 | Richardson | Dec. 17, 1895 |
| 797,185 | Diehl | Aug. 15, 1905 |
| 834,928 | Neilson | Nov. 6, 1906 |
| 1,111,759 | Parker | Sept. 29, 1914 |
| 2,475,471 | Brown et al. | July 5, 1949 |
| 2,533,626 | Reiter | Dec. 12, 1950 |
| 2,610,355 | Becker | Sept. 16, 1952 |